US006275397B1

(12) United States Patent
McClain

(10) Patent No.: US 6,275,397 B1
(45) Date of Patent: Aug. 14, 2001

(54) POWER FACTOR CORRECTION CONTROL CIRCUIT FOR REGULATING THE CURRENT WAVESHAPE IN A SWITCHING POWER SUPPLY

(75) Inventor: Edward L. McClain, Los Angeles, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/604,381

(22) Filed: Jun. 27, 2000

(51) Int. Cl.$^7$ .................................................. H02M 5/42
(52) U.S. Cl. .................................. 363/89; 363/37
(58) Field of Search .......................... 363/84, 89, 34, 363/78, 127, 37

(56) References Cited

U.S. PATENT DOCUMENTS

| 4,677,366 | 6/1987 | Wilkinson et al. . | |
|---|---|---|---|
| 4,683,529 | 7/1987 | Bucher, II . | |
| 4,885,675 | * 12/1989 | Henze et al. | 363/26 |
| 5,003,454 | * 3/1991 | Bruning | 363/81 |
| 5,391,976 | 2/1995 | Farrington et al. . | |
| 5,502,370 | 3/1996 | Hall et al. . | |
| 5,602,465 | 2/1997 | Clemente . | |
| 5,614,810 | 3/1997 | Nostwick et al. . | |
| 5,687,070 | 11/1997 | Jacobs et al. . | |
| 5,790,395 | 8/1998 | Hagen . | |
| 5,903,138 | * 5/1999 | Hwang et al. | 323/266 |
| 5,920,471 | 7/1999 | Rajagopalan et al. . | |
| 5,982,638 | 11/1999 | Tang et al. . | |
| 6,031,749 | * 2/2000 | Covington et al. | 363/98 |

* cited by examiner

Primary Examiner—Adolf Deneke Berhane
(74) Attorney, Agent, or Firm—O'Melveny & Myers LLP

(57) ABSTRACT

A switching power supply comprises an AC rectifier adapted to receive an AC line voltage and provide an input voltage ($V_{IN}$) therefrom having a haversine waveform. A switching power converter is connected to the AC rectifier and provides a DC output voltage ($V_{OUT}$) for a load. The switching power converter comprises an inductor and a power switch adapted to control current in the inductor. A pulse width modulator provides a drive signal to the power switch having a variable duty cycle to regulate current provided to the load by the switching power converter. A power factor correction circuit is adapted to control operation of the pulse width modulator so that a waveshape of the current from the AC rectifier matches the output voltage ($V_{OUT}$) with changes in the input voltage ($V_{IN}$) and load. More particularly, the power factor correction circuit further comprises a voltage error circuit providing a voltage error signal corresponding to a difference between the output voltage ($V_{OUT}$) and a reference voltage, a differential amplifier circuit generating a current program signal based in part on the voltage error signal, including an amplifier circuit to amplify a scaled input voltage ($V_{IN}$) signal with gain determined by the voltage error signal, and a current error circuit controlling the pulse width modulator based on the current program signal and a current sense signal corresponding to the current from the AC rectifier. The amplifier circuit further comprises a field effect transistor (FET) biased in a saturation condition to thereby provide a resistance that varies in accordance with the voltage error signal. The gain of the amplifier circuit is determined by the resistance. The differential amplifier circuit further comprises a second amplifier circuit adapted to amplify a difference between the scaled input voltage ($V_{IN}$) signal and the amplified scaled input voltage ($V_{IN}$) signal from the first amplifier circuit.

19 Claims, 2 Drawing Sheets

US 6,275,397 B1

POWER FACTOR CORRECTION CONTROL CIRCUIT FOR REGULATING THE CURRENT WAVESHAPE IN A SWITCHING POWER SUPPLY

BACKGROUND OF THE INVENTION

1. Field of the Invention

The present invention relates to switching power supplies, and more particularly, to a dynamic power factor correction control circuit for a switching power supply that regulates the current wave shape to match the input voltage wave shape in order to obtain close to unity power factor.

2. Description of Related Art

In view of the ever-increasing number of electronic devices that require a direct current (DC) source voltage, power supply circuits are well known in the art for converting an alternating current (AC) line voltage into a DC voltage. Such power supply circuits are known to include a full wave rectifier that converts the AC line voltage to a haversine signal, and a switching converter that converts the haversine signal to a relatively high DC output voltage level (e.g., 360 volts). The DC output voltage may be further reduced to a lower DC voltage level usable by an electronic device by coupling the power supply circuit to additional DC-to-DC converter circuits. Power supply circuits of this type tend to have a poor effective power factor (i.e., the ratio of true power to apparent power in an AC circuit) since they draw input current in short pulses of high peak value such that the current waveform is not sinusoidal. In order to maximize the actual power that can be drawn from a power supply, it is known to include a power factor correction (PFC) control circuit that controls the magnitude and phase of the input current to be sinusoidal and match the line voltage.

One conventional type of PFC control circuit derives a reference signal for the input current from a multiplier that scales the reference signal according to the deviation of the output voltage from its desired value. The output voltage is sampled by a voltage divider stage to provide an output reference signal that is feed to an error amplifier. The output of the error amplifier is then sampled by a sample/hold stage to scale the multiplication process. A drawback of this type of PFC control circuit is that the output power is dependent upon the square of the input voltage. This is undesirable since the purpose of the PFC control circuit is to either make the load appear to the line as a resistor (i.e., current proportional and in phase to voltage) or to supply power to a load that is relatively constant and independent of line fluctuations while improving its power factor. To address this drawback, it is also known to include a feed forward loop that divides the output of the error amplifier by the square of the input voltage. These circuits have limitations associated with the use of the arithmetic devices (i.e., multipliers and dividers), such as scaling errors, offsets and drifts, as well as increased complexity and associated cost due to the multiplicity of circuit components.

Accordingly, it would be very desirable to provide a simplified power factor correction control circuit for a switching power supply that regulates the current waveshape to match the input voltage waveshape.

SUMMARY OF THE INVENTION

The present invention is directed to a simplified power factor correction circuit that regulates the current waveshape to match the input voltage waveshape, while avoiding the complexity of the prior art power factor correction circuits.

In an embodiment of the invention, a switching power supply comprises an AC rectifier adapted to receive an AC line voltage and provide an input voltage ($V_{IN}$) therefrom having a haversine waveform. A switching power converter is connected to the AC rectifier and provides a DC output voltage ($V_{OUT}$) for a load. The switching power converter comprises an inductor and a power switch adapted to control current in the inductor. A pulse width modulator provides a drive signal to the power switch having a variable duty cycle to regulate current provided to the load by the switching power converter. A power factor correction circuit is adapted to control operation of the pulse width modulator so that a waveshape of the current from the AC rectifier matches the output voltage ($V_{OUT}$) with changes in the input voltage ($V_{IN}$) and load.

More particularly, the power factor correction circuit further comprises a voltage error circuit providing a voltage error signal corresponding to a difference between the output voltage ($V_{OUT}$) and a reference voltage, a differential amplifier circuit generating a current program signal based in part on the voltage error signal, including an amplifier circuit to amplify a scaled input voltage ($V_{IN}$) signal with gain determined by the voltage error signal, and a current error circuit controlling the pulse width modulator based on the current program signal and a current sense signal corresponding to the current from the AC rectifier. The amplifier circuit further comprises a field effect transistor (FET) biased in a saturation condition to thereby provide a resistance that varies in accordance with the voltage error signal. The gain of the amplifier circuit is determined by the resistance. The differential amplifier circuit further comprises a second amplifier circuit adapted to amplify a difference between the scaled input voltage ($V_{IN}$) signal and the amplified scaled input voltage ($V_{IN}$) signal from the first amplifier circuit.

A more complete understanding of the power factor correction control circuit will be afforded to those skilled in the art, as well as a realization of additional advantages and objects thereof, by a consideration of the following detailed description of the preferred embodiment. Reference will be made to the appended sheets of drawings that will first be described briefly.

DESCRIPTION OF THE PREFERRED EMBODIMENT

The present invention satisfies the need for a simplified power factor correction control circuit for a switching power supply that regulates the current waveshape to match the input voltage waveshape. In the detailed description that follows, like element numerals are used to describe like elements illustrated in one or more of the figures.

Figure 1:
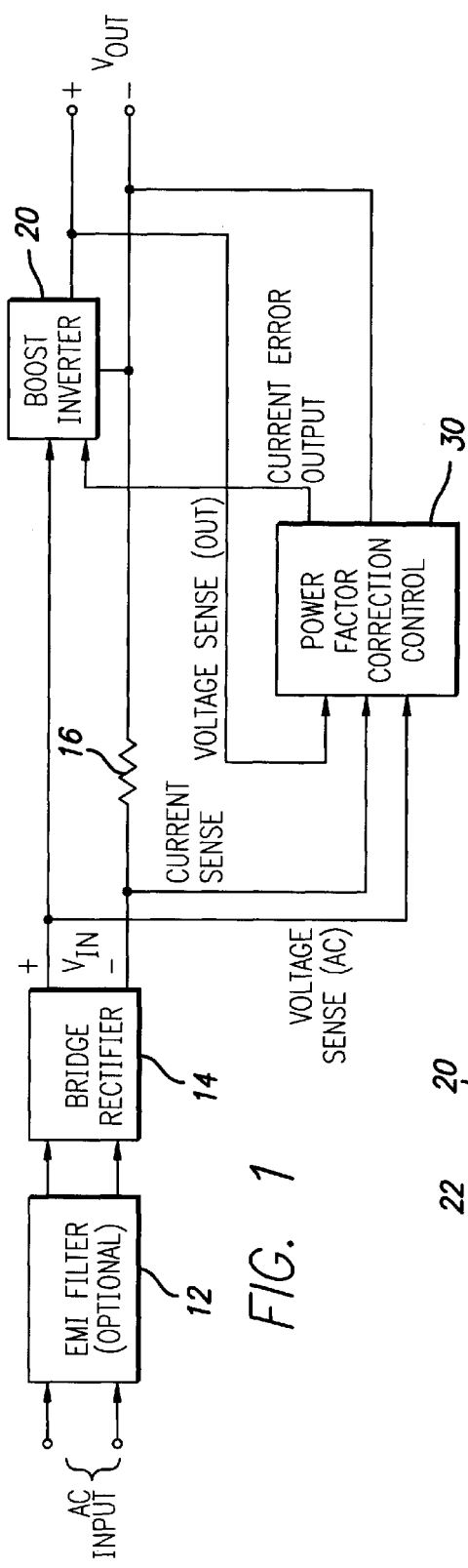
FIG. 1 is a block diagram of a switching power supply having a power factor correction control circuit in accordance with the present invention.
Figure 3:
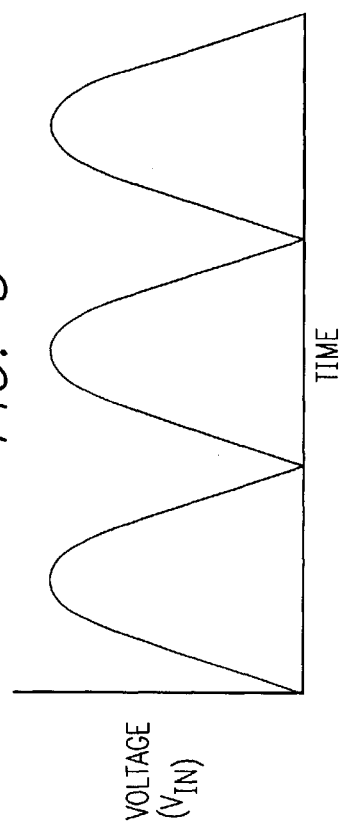
FIG. 3 is a graph showing a haversine voltage waveform taken at the input to the boost inverter.

Referring first to FIG. 1, a block diagram is shown of a switching power supply having a power factor correction control circuit in accordance with the present invention. The switching power supply 10 comprises an electromagnetic interference (EMI) filter 12, a bridge rectifier 14, a current sense resistor 16, a boost inverter circuit 20 and a power factor correction (PFC) control circuit 30. An AC line input is connected to the EMI filter 12, which removes high frequency components of the AC line input. The EMI filter 12 may comprise a series filter inductor and one or more capacitors, as generally known in the art. The filtered AC line input is provided to the bridge rectifier 14, which converts the AC signal to a voltage waveform referred to herein as a haversine waveform. FIG. 3 illustrates an exemplary haversine waveform as comprising a series of half-sine wave pulses that each start and end at zero volts and rise to a peak voltage therebetween. Returning again to FIG. 1, the haversine voltage waveform from the bridge rectifier 14 is provided to the boost inverter circuit 20, which converts the haversine voltage waveform to a high voltage DC output (e.g., 360 volts). The DC output may be further coupled to a load, such as an electronic ballast for fluorescent lamps, or to other circuitry such as a DC-to-DC voltage converter (not shown) for the purpose of reducing the high voltage DC output to a lower DC output (e.g., 12 volts). It should be appreciated that the EMI filter 12 is optional, and it would also be possible to connect the AC line directly to the bridge rectifier 14 depending upon the EMI requirements of the end usage of the switching power supply 10.

Figure 2:
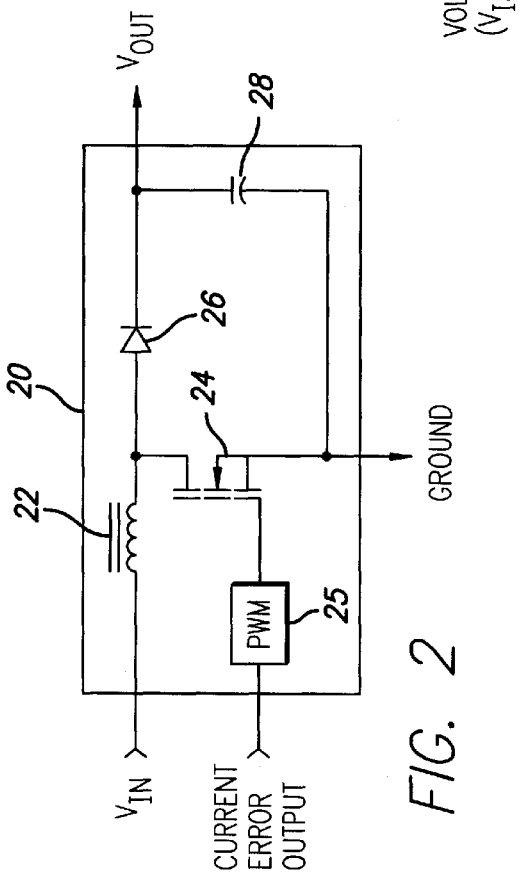
FIG. 2 is an electrical schematic diagram of a boost inverter used in the switching power supply of FIG. 1.

The boost inverter circuit 20 is illustrated in greater detail in FIG. 2. Particularly, the boost inverter circuit 20 comprises an inductor 22, a power switch 24, a diode 26, a capacitor 28, and a pulse width modulator (PWM) 25. The inductor 22 and the diode 26 are connected in series between the positive terminal of the bridge rectifier 14 and the positive DC output terminal of the switching power supply 10. The capacitor 28 is coupled across the DC output terminals of the boost inverter 20. The power switch 24 is provided by a field effect transistor (FET) that has its drain terminal connected to the junction between the inductor 22 and the diode 26, and its source terminal connected to ground. The PWM 25 provides a control signal to the gate terminal of the power switch 24. The PWM 25 provides a series of pulses with a duty cycle determined by an input signal provided thereto by the PFC control circuit 30 (described below). For example, as the input signal goes from 0 to 10 volts, the duty factor ranges from 0 to 0.90, in which the duty factor corresponds to the ON time of the power switch 24 divided by the frequency of the duty cycle.

When the power switch 24 is ON (i.e., conducting), energy is stored in the inductor 22; conversely, when the power switch is OFF (i.e., non-conducting), the energy in the inductor is transferred to the capacitor 28 through the diode 26. The load coupled to the DC output terminals draws energy from the capacitor 28. More specifically, during the OFF time of the power switch 24, current flows from the positive terminal of the bridge rectifier 14 through the inductor 22 and the diode 26 to the DC output terminal. This causes the capacitor 28 to charge to a steady state DC voltage ($V_{OUT}$) that is higher than the voltage across the terminals of the bridge rectifier ($V_{IN}$). At that point, the voltage across the inductor 22 is negative, which causes magnetic flux and current in the inductor 22 to decrease. Because magnetic flux is proportional to inductor current, the inductor current decreases when magnetic flux decreases. During the ON time of the power switch 24, current flows from the positive terminal of the bridge rectifier 14 through the inductor 22 and the power switch 24 to ground. The capacitor 28 thereby discharges through the load coupled to the DC output terminals. The voltage across the inductor 22 turns positive, which causes magnetic flux in the inductor to increase. Thus, as the pulse width of the control signal provided to the power switch 24 by the PWM 25 increases, the amount of current flowing into the inductor 22 increases. Preferably, the duty cycle of the power switch 24 is controlled such that the output voltage ($V_{OUT}$) will remain constant with changing load conditions at the DC output terminals. It should be appreciated that the switching power supply 10 could advantageously utilize other types of switching circuits in place of the boost inverter circuit 20, such as a fly-back converter.

Returning again to FIG. 1, the PFC control circuit 30 controls the duty cycle of the power switch 24. The PFC control circuit 30 receives three control signals, including an input voltage sense signal, an output voltage sense signal, and a current sense signal. The input voltage sense signal corresponds to the input voltage ($V_{IN}$) across the terminals of the bridge rectifier 14. The output voltage sense signal corresponds to the output voltage ($V_{OUT}$) from the boost inverter circuit 20. The current sense signal corresponds to the negative current flowing through resistor 16 back to the bridge rectifier 14. The PFC control circuit 30 generates a current error output signal that is provided to the PWM 25 of the boost inverter circuit 20. As the input voltage ($V_{IN}$) increases, reflecting an increase in the AC input line voltage, the current error output signal is decreased in order to reduce the amplitude of the current from the boost inverter circuit 20. Similarly, if the output voltage ($V_{OUT}$) decreases, reflecting an increase in load coupled to the output terminals of the boost inverter circuit 20, the current error output signal is increased in order to increase the amplitude of the current from the boost inverter circuit 20.

Figure 4:
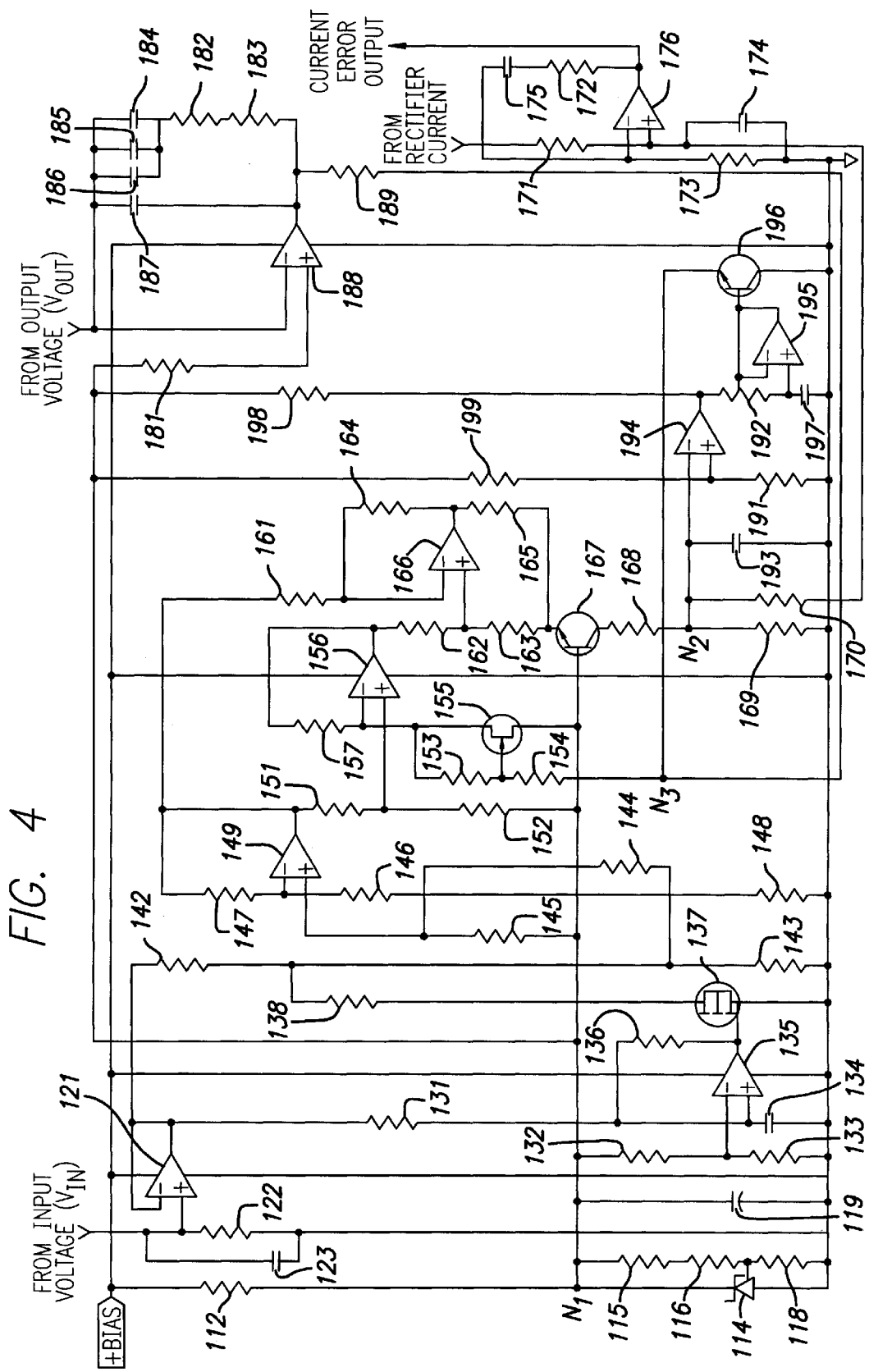
FIG. 4 is an electrical schematic diagram of a power factor correction control circuit in accordance with an embodiment of the invention.

Referring now to FIG. 4, an embodiment of a PFC control circuit 100 is illustrated. As in the embodiment of FIG. 1, the PFC control circuit 100 receives as inputs the input voltage ($V_{IN}$) sense signal, the output voltage ($V_{OUT}$) sense signal, and the current sense signal, and generates the current error output signal that is provided to the PWM. A positive bias voltage (+BIAS) provides power for the various CMOS devices of the PFC control circuit 100. The PFC control circuit 100 further provides a reference voltage utilized for line detection, voltage error reference, boost over-voltage protection, inverter enable and negative bias. This portion of the circuit includes a programmable zener diode 114, resistors 112, 115, 116, and 118, and capacitor 119. Resistor 112 and programmable zener diode 114 are connected in series between the positive bias terminal (+BIAS) and ground, with a reference node N1 defined therebetween. Resistors 115, 116 and 118 are connected in series between the reference node N1 and ground, and define a voltage divider circuit in which the voltage across resistor 118 is applied to the programmable zener diode 114. The programmable zener diode 114 defines a reference voltage (e.g., 7.5 volts) relative to ground that is used by other portions of the PFC control circuit 100, as will be further described below. The capacitor 119 reduces noise components present in the reference voltage.

The PFC control circuit 100 next reduces the input voltage ($V_{IN}$) sense signal to a lower voltage used for current programming, line detection, current limiting and range shifting. This portion of the circuit includes operational amplifier 121, resistor 122, and capacitor 123. The input voltage ($V_{IN}$) sense signal is coupled to a voltage divider circuit that includes an external resistor (not shown) in series with resistor 122 coupled to ground. The resistance values can be selected to achieve a high reduction ratio of the voltage (e.g., 274:1). Capacitor 123 is connected in parallel with resistor 122 and reduces noise components present on the scaled input voltage ($V_{IN}$). The scaled input voltage present across the resistor 122 is applied to the non-inverting input terminal of operational amplifier 121. The inverting input terminal of the operational amplifier 121 is connected to the output terminal of the operational amplifier in order to achieve unity gain. The operational amplifier 121 serves as a buffer for the scaled input voltage signal.

The scaled input voltage signal is then provided to another portion of the PFC control circuit 100, which re-references the scaled input voltage to the reference voltage present at node N1. This portion of the circuit includes resistors 142–148 and operational amplifier 149. Resistors 142 and 143 are connected in series between the output terminal of operational amplifier 121 and ground to provide a voltage divider. The non-inverting input terminal of operational amplifier 149 is connected to the reference voltage through resistor 145, and to the junction between resistors 142, 143 through resistor 144. The inverting input terminal of operational amplifier 149 is connected to ground through resistors 146, 148. The inverting input terminal and output terminal of the operational amplifier 149 are connected through resistor 147, and the resistance values are selected to provide unity gain of the operational amplifier 149. The voltage developed across resistor 143 corresponds to the scaled input voltage. Thus, the output from the operational amplifier 149 corresponds to the scaled input voltage referenced to the reference voltage at node N1.

The PFC control circuit 100 further includes a range shifting circuit used to shift the range of the scaled input voltage from the operational amplifier 121 in order to accommodate large changes in the input line voltage. This way, the PFC control circuit 100 can have greater sensitivity over a limited range in order to provide greater overall dynamic range. The range shifting circuit includes resistors 131, 132, 133, 136 and 138, capacitor 134, operational amplifier 135, and field effect transistor 137. The resistor 131 is connected between the output terminal of the operational amplifier 121 and the inverting input terminal of the operational amplifier 135, which is in turn connected to ground through the capacitor 134. Resistors 132 and 133 are connected together in series between the reference voltage node N1 and ground, and the junction between these resistors is connected to the non-inverting input terminal of the operational amplifier 135. Resistor 136 provides a feedback loop between the inverting input terminal and the output terminal of the operational amplifier 135. The output terminal of the operational amplifier 135 is connected to the gate terminal of the field effect transistor 137. The drain of the field effect transistor 137 is connected to ground and the source is connected to resistor 138, which is in turn connected to the junction between resistors 142, 143.

The voltage divider formed by resistors 132, 133 provides a reference voltage (less than the reference voltage at node N1) to the inverting input terminal of the operational amplifier 135. The scaled input voltage ($V_{IN}$) is applied to the capacitor 134, which averages the scaled input voltage. This averaged and scaled input voltage ($V_{IN}$) is then applied to the non-inverting input terminal of the operational amplifier 135. As long as the average voltage across the capacitor 134 remains below the reference voltage applied to the inverting input terminal of the operational amplifier 135, the output of the operational amplifier will be negative and the field effect transistor 137 will be non-conducting. If the average voltage across the capacitor 134 rises above the reference voltage applied to the inverting input terminal of the operational amplifier 135, reflecting a sharp increase in the AC line voltage, then the output of the operational amplifier will become positive. This causes the field effect transistor 137 to conduct and couple resistor 138 in parallel with resistor 143, thereby reducing the voltage across resistor 138 and shifting the range of the scaled input voltage ($V_{IN}$) applied to the operational amplifier 149.

Next, the PFC control circuit 100 amplifies the scaled input voltage ($V_{IN}$) with a gain determined by the output voltage ($V_{OUT}$). This portion of the circuit includes resistors 151–155, 157, n-channel field effect transistor (FET) 155 and operational amplifier 156. Resistors 151, 152 are connected in series between the output terminal of the operational amplifier 149 and ground, thereby defining a voltage across resistor 152 that is connected to the non-inverting input terminal of the operational amplifier 156. The FET 155 has a gate terminal connected to a voltage divider defined by resistors 153, 154, a drain terminal connected to ground, and a source terminal connected to the inverting input terminal of operational amplifier 156. Resistor 157 provides a feedback path between the inverting input terminal and the output terminal of the operational amplifier 156. Resistor 154 is further connected to voltage error node N3, which is in turn connected to a subsequent portion of the PFC control circuit 100 (described below) that provides a voltage error signal corresponding to the difference between the output voltage ($V_{OUT}$) and the reference voltage.

The resistance values of resistors 153, 154 are selected such that the FET 155 is operated in the saturated region (i.e., less than 0.3 volts source to drain), causing the FET to be resistive in nature. As the control voltage applied to the gate terminal becomes less negative (for an n-channel FET), the resistance of the FET decreases. For example, a conventional FET such as the Model No. 2N4416 made by Fairchild Semiconductor, Inc. has a resistance of approximately 3,000 ohms at a negative control voltage of 3.5 volts; in contrast, the FET device has a resistance of 15 ohms at a control voltage of 0 volts. While an n-channel FET device is illustrated in FIG. 4, it should be appreciated that a p-channel device could also be advantageously utilized.

The gain of the operational amplifier 156 is equal to the resistance of the feedback resistor 157 divided by the resistance of the FET 155 plus one. Thus, the gain of the operational amplifier 156 is a function of the voltage error signal. As the voltage error signal increases, corresponding to an increase in the output voltage ($V_{OUT}$) relative to the reference voltage, the voltage applied to the gate terminal of the FET 155 becomes more positive and the resistance of the FET decreases. The reduction in resistance of the FET 155 thereby increases the gain of the operational amplifier 156. Conversely, as the voltage error signal decreases, the voltage applied to the gate terminal of the FET 155 becomes less positive and the resistance of the FET increases, thereby decreasing the gain of the operational amplifier 156.

The PFC control circuit 100 further includes a differential amplifier that provides a signal corresponding to the difference between the outputs of the operational amplifier 156 and the operational amplifier 149. The differential amplifier includes resistors 161–165, 168–170, operational amplifier 166 and transistor 167. The inverting input terminal of the operational amplifier 166 is coupled to the output terminal of operational amplifier 149 through resistor 161. The non-inverting input terminal of the operational amplifier 166 is connected to the output terminal of the operational amplifier 156 through resistor 162. The non-inverting input terminal of the operational amplifier 166 is also coupled to the emitter of transistor 167 through resistor 163, and the output terminal of the operational amplifier 166 is coupled to the emitter of transistor 167 through resistor 165. Resistor 164 provides a feedback path between the output terminal and the inverting input terminal of the operational amplifier 166. The resistances of resistors 161–164 are selected to provide unity gain for the operational amplifier 166. The base of the transistor 167 is connected to the reference voltage. The collector of the transistor 167 provides a programming signal through resistor 168 to node N2, which is in turn connected to resistor 170 for controlling the current of the switching power supply and to ground through resistor 169. The resistor 165 converts the output voltage of the operational amplifier 166 to current that is injected into the emitter of transistor 167, and this current is then converted to voltage referenced to ground by resistor 169. The resistance of resistor 165 is equal to that of resistor 169, so that the voltage drop across these two resistors is the same. The output of the operational amplifier 166 will swing more positive if the output voltage ($V_{OUT}$) drops relative to the input voltage ($V_{IN}$), thereby indicating a demand for increased current from the boost inverter. Conversely, the output of the operational amplifier 166 will swing negative (or less positive) if the input voltage ($V_{IN}$) drops relative to the output voltage ($V_{OUT}$), thereby indicating a demand for decreased current from the boost inverter.

The PFC control circuit 100 further includes a current error amplifier that provides the current error signal to the PWM. This current error amplifier includes resistors 171–173, capacitors 174, 175, and an operational amplifier 176. The inverting input terminal of the operational amplifier 176 is connected to the signal ground through resistor 173. The non-inverting input terminal of the operational amplifier 176 receives two inputs including the current sense signal through resistor 171 and the current programming signal through resistor 170. Resistor 172 and capacitor 175 provide a feedback path between the output terminal and the inverting input terminal of the operational amplifier 176, and provides a low pass filter that removes high frequency components of the current error signal from the operational amplifier. The output of the operational amplifier 176 is connected to the PWM, whereby an increasing positive input results in an increasing pulse width. The output of the PWM drives the boost inverter, as described above. Thus, the current error amplifier will provide a more positive voltage to the PWM if either the programming signal from the differential amplifier reflects a drop in the output voltage ($V_{OUT}$) or the current sense reflects an increase in current between the rectifier and the boost inverter.

A voltage error amplifier compares the DC output voltage ($V_{OUT}$) to a reference voltage and provides the voltage error signal. The voltage error amplifier includes resistors 181–183, 189, capacitors 184–187, and operational amplifier 188. The non-inverting input terminal of the operational amplifier 184 is connected to the reference voltage at node N1 through resistor 181. The inverting input terminal of the operational amplifier 188 is connected to the output of boost inverter through a resistor (not shown) that divides down the output voltage ($V_{OUT}$) to a level comparable to the reference voltage. A compensation circuit comprising capacitors 184–187 and resistors 182, 183 provides a feedback path between the inverting input terminal and the output terminal of the operational amplifier 188. The compensation circuit provides a low pass filter that removes high frequency components of the voltage error signal from the operational amplifier. The output of the operational amplifier 184 provides the aforementioned voltage error signal through resistor 189 to node N3.

Lastly, the PFC control circuit 100 includes a current limiting circuit that keeps the output current from the boost inverter sinusoidal and prevents the current from clipping. The current limiting circuit includes resistors 191, 198, 199, capacitors 193, 197, operational amplifiers 194, 195, and transistor 196. The capacitor 193 is coupled across the resistor 169 and removes noise from the voltage that defines the current programming signal (described above). The non-inverting input terminal of the operational amplifier 194 is connected to the reference voltage node N1 through resistor 199, and to resistor 191 coupled to ground. The inverting input terminal of the operational amplifier 194 is connected to the current programming signal node N2. The output terminal of the operational amplifier 194 is connected to the non-inverting input terminal of the operational amplifier 195 through resistor 192, and is connected to the reference voltage node N1 through resistor 198. Capacitor 192 is connected between the non-inverting input terminal of the operational amplifier 195 and ground. The inverting input terminal and the output terminal of the operational amplifier 195 are connected together, and are connected to the base terminal of transistor 196. The collector terminal of the transistor 196 is connected to ground, and the emitter terminal is connected to the voltage error output node N3.

Under normal operating conditions, the capacitor 197 is charged by current flowing through resistors 192, 198, causing the operational amplifier 195 to provide a positive voltage at the output terminal. This causes the transistor 196 to be non-conducting. In a condition in which the voltage at the inverting input terminal of the operational amplifier 194 rises above the reference voltage, reflecting that the PFC control circuit 100 is increasing the voltage of the signal to the PWM, the output of the operational amplifier 194 turns negative. This begins to discharge the capacitor 197. When the capacitor 197 becomes fully discharged, the output of the operational amplifier 195 turns negative, which causes the transistor 196 to conduct and couple the voltage error node N3 to ground. As a result, the current from the boost inverter is prevented from increasing so much that it will clip, or become non-sinusoidal. The capacitor 197 may be provided with a large capacity so that it does not discharge too quickly.

Having thus described a preferred embodiment of a power factor correction control circuit, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. A switching power supply, comprising
an AC rectifier adapted to receive an AC line voltage and provide an input voltage ($V_{IN}$) therefrom having a haversine waveform;
a switching power converter connected to the AC rectifier and providing a DC output voltage ($V_{OUT}$) for a load, said switching power converter comprising an inductor and a power switch adapted to control current in said inductor;

a pulse width modulator providing a drive signal to said power switch having a variable duty cycle to regulate current provided to said load by said switching power converter; and a power factor correction circuit adapted to control operation of said pulse width modulator so that a waveshape of said current from said AC rectifier matches said output voltage ($V_{OUT}$) with changes in said input voltage ($V_{IN}$) and said load, said power factor correction circuit further comprising:

voltage error means for providing a voltage error signal corresponding to a difference between said output voltage ($V_{OUT}$) and a reference voltage;

differential amplifier means for generating a current program signal based in part on said voltage error signal, said differential amplifier means comprising a first amplifier circuit adapted to amplify a scaled input voltage ($V_{IN}$) signal with gain determined by said voltage error signal; and current error means for controlling said pulse width modulator based on said current program signal and a current sense signal corresponding to said current from said AC rectifier such that said pulse width modulator increases the duty factor of said power switch when the sum of said current sense signal and said current program signal is positive and decreases the duty factor of said power switch when the sum of said current sense signal and said current program signal is negative.

2. The switching power supply of claim 1, wherein said first amplifier circuit further comprises a field effect transistor (FET) biased in a saturation condition to thereby provide a resistance that varies in accordance with said voltage error signal, wherein said gain of said first amplifier circuit is determined by said resistance.

3. The switching power supply of claim 1, wherein said differential amplifier means further comprises a second amplifier circuit adapted to amplify a difference between said scaled input voltage ($V_{IN}$) signal and said amplified scaled input voltage ($V_{IN}$) signal from said first amplifier circuit.

4. The switching power supply of claim 1, wherein said power factor correction circuit further comprises means for defining a reference voltage.

5. The switching power supply of claim 1, wherein said power factor correction circuit further comprises means for limiting said current in said inductor of said switching power converter.

6. The switching power supply of claim 1, wherein said power factor correction circuit further comprises means for reducing scale of said input voltage ($V_{IN}$) signal to provide said scaled input voltage ($V_{IN}$) signal.

7. The switching power supply of claim 1, wherein said switching power converter further comprises a boost inverter.

8. A power factor correction circuit for use in a switching power supply comprising an AC rectifier adapted to receive an AC line voltage and provide an input voltage ($V_{IN}$) therefrom having a haversine waveform, a switching power converter connected to the AC rectifier and providing a DC output voltage ($V_{OUT}$) for a load, said switching power converter comprising an inductor and a power switch adapted to control current in said inductor, and a pulse width modulator providing a drive signal to said power switch having a variable duty cycle to regulate current provided to said load by said switching power converter, said power factor correction circuit being adapted to control operation of said pulse width modulator so that a waveshape of said current from said AC rectifier matches said output voltage ($V_{OUT}$) with changes in said input voltage ($V_{IN}$) and said load, said power factor correction circuit further comprising:

voltage error means for providing a voltage error signal corresponding to a difference between said output voltage ($V_{OUT}$) and a reference voltage;

differential amplifier means for generating a current program signal based in part on said voltage error signal, said differential amplifier means comprising a first amplifier circuit adapted to amplify a scaled input voltage ($V_{IN}$) signal with gain determined by said voltage error signal; and current error means for controlling said pulse width modulator based on said current program signal and a current sense signal corresponding to said current from said AC rectifier such that said pulse width modulator increases the duty factor of said power switch when the sum of said current sense signal and said current program signal is positive and decreases the duty factor of said power switch when the sum of said current sense signal and said current program signal is negative.

9. The power factor correction circuit of claim 8, wherein said first amplifier circuit further comprises a field effect transistor (FET) biased in a saturation condition to thereby provide a resistance that varies in accordance with said voltage error signal, wherein said gain of said first amplifier circuit is determined by said resistance.

10. The power factor correction circuit of claim 8, wherein said differential amplifier means further comprises a second amplifier circuit adapted to amplify a difference between said scaled input voltage ($V_{IN}$) signal and said amplified scaled input voltage ($V_{IN}$) signal from said first amplifier circuit.

11. The power factor correction circuit of claim 8, further comprising means for defining a reference voltage.

12. The power factor correction circuit of claim 8, further comprising means for limiting said current in said inductor of said switching power converter.

13. The power factor correction circuit of claim 8, further comprising means for reducing scale of said input voltage ($V_{IN}$) signal to provide said scaled input voltage ($V_{IN}$) signal.

14. In a switching power supply comprising an AC rectifier adapted to receive an AC line voltage and provide an input voltage ($V_{IN}$) therefrom having a haversine waveform, a switching power converter connected to the AC rectifier and providing a DC output voltage ($V_{OUT}$) for a load, said switching power converter comprising an inductor and a power switch adapted to control current in said inductor, and a pulse width modulator providing a drive signal to said power switch having a variable duty cycle to regulate current provided to said load by said switching power converter, a method for correcting power factor of said switching power supply whereby a waveshape of said current from said AC rectifier matches said output voltage ($V_{OUT}$) with changes in said input voltage ($V_{IN}$) and said load comprises:

providing a voltage error signal corresponding to a difference between said output voltage ($V_{OUT}$) and a reference voltage;

generating a current program signal by amplifying a scaled input voltage ($V_{IN}$) signal with gain determined by said voltage error signal; and controlling said pulse width modulator based on said current program signal and a current sense signal corresponding to said current from said AC rectifier such that said pulse width modulator increases the duty factor of said power switch when the sum of said current sense signal and said current program signal is positive and decreases the duty factor of said power switch when the sum of said current sense signal and said current program signal is negative.

15. The method of claim 14, wherein said generating step further comprises biasing a field effect transistor (FET) in a saturation condition to thereby provide a resistance that varies in accordance with said voltage error signal, wherein said gain of said first amplifier circuit is determined by said resistance.

16. The method of claim 14, wherein said generating step further comprises amplifying a difference between said scaled input voltage ($V_{IN}$) signal and said amplified scaled input voltage ($V_{IN}$) signal.

17. The method of claim 14, further comprising defining a reference voltage.

18. The method of claim 14, further comprising limiting said current in said inductor of said switching power converter.

19. The method of claim 14, further comprising reducing scale of said input voltage ($V_{IN}$) signal to provide said scaled input voltage ($V_{IN}$) signal.

* * * * *